United States Patent [19]

Tanaka et al.

[11] Patent Number: 5,825,817
[45] Date of Patent: Oct. 20, 1998

[54] RADIO WAVE MEASURING APPARATUS FOR DIGITAL COMMUNICATION SYSTEM

[75] Inventors: Takanori Tanaka, Atsugi; Yasuhiko Shimura, Hadano; Hirokazu Yanagawa, Hiratsuka, all of Japan

[73] Assignee: Anritsu Corporation, Tokyo, Japan

[21] Appl. No.: 504,736

[22] Filed: Jul. 19, 1995

[30] Foreign Application Priority Data

Jul. 22, 1994 [JP] Japan .................................. 6-170858
Sep. 19, 1994 [JP] Japan .................................. 6-222313

[51] Int. Cl.$^6$ ..................................................... H04J 3/00
[52] U.S. Cl. ......................... 375/228; 375/224; 455/67.1; 455/67.7; 455/226.1; 455/226.4; 455/566
[58] Field of Search ................................... 375/224, 228, 375/325, 326, 340; 455/67.1, 67.3, 67.7, 226.1, 226.2, 226.4, 525, 566; 370/252, 336, 345

[56] References Cited

U.S. PATENT DOCUMENTS

| | | | |
|---|---|---|---|
| 4,661,995 | 4/1987 | Kashiwagi | 455/183.2 |
| 5,119,018 | 6/1992 | Katayama et al. | 324/79.27 |
| 5,193,216 | 3/1993 | Davis | 455/67.7 |
| 5,239,667 | 8/1993 | Kanai | 455/226.2 X |
| 5,359,607 | 10/1994 | Nguyen et al. | 371/5.5 |
| 5,450,623 | 9/1995 | Yokoyama et al. | 455/226.1 |
| 5,475,709 | 12/1995 | Futagami et al. | 375/224 |
| 5,621,757 | 4/1997 | Hori | 375/224 |
| 5,630,210 | 5/1997 | Marry et al. | 455/67.3 |

OTHER PUBLICATIONS

"Personal Digital Cellular Telecommunication System RCR Standard"; Apr. 1991; p. 30; RCR STD-27C (Fascile 11);
"Personal Handy Phone System"; Dec. 1993; RCR STD-28 and its Japanese version.

"Adaptive Carrier Tracking (ACT) Demodulation LSI NLC 5010 F"; NTT Electronics Technology Corporation (Tokyo, Japan).

"64-bit Digital Correlator L10C23", Logic Devices Incorporated; Dec. 1993; pp. 3-45 through 3-51.

Primary Examiner—Young T. Tse
Attorney, Agent, or Firm—Frishauf, Holtz, Goodman, Langer & Chick

[57] ABSTRACT

In one aspect of this invention, a receiver sequentially demodulates sequentially received burst signals into original digital data signals. A data extraction unit extracts base station information from the digital data signals sequentially demodulated by the receiver. A level detector detects the signal levels of received signals containing the burst signals sequentially received by the receiver. A control unit causes a display unit to display the signal levels detected by the level detector in accordance with elapse of the reception time, and display the base station information extracted by the data extraction unit. In another aspect of this invention, a determination unit quantitatively determines errors of the burst signals from the digital data signals sequentially demodulated by the receiver, and outputs the determination results concerning the validity of the digital data contained in the burst signals. The data processing unit causes the display unit to display the measurement levels and the determination results concerning the validity of the data for designated base stations.

27 Claims, 9 Drawing Sheets

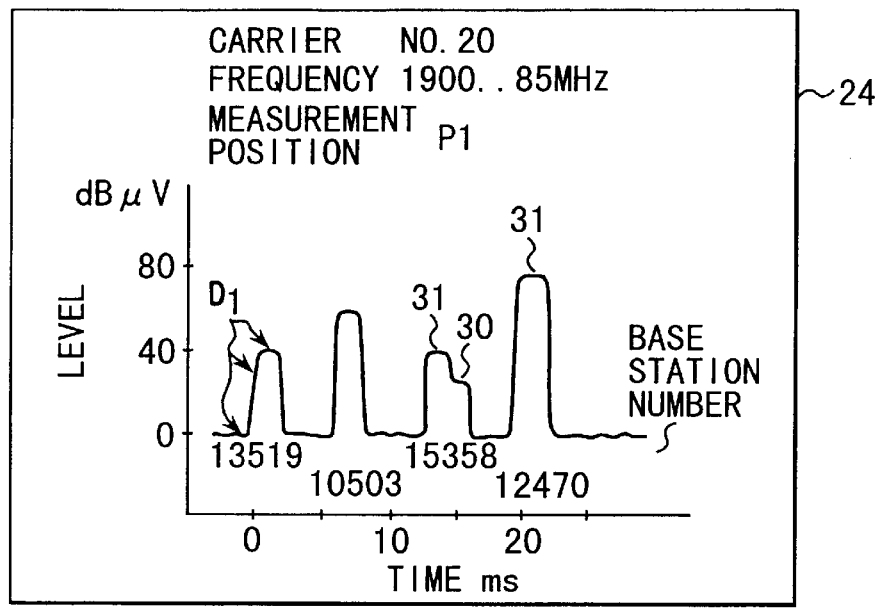
F I G. 6
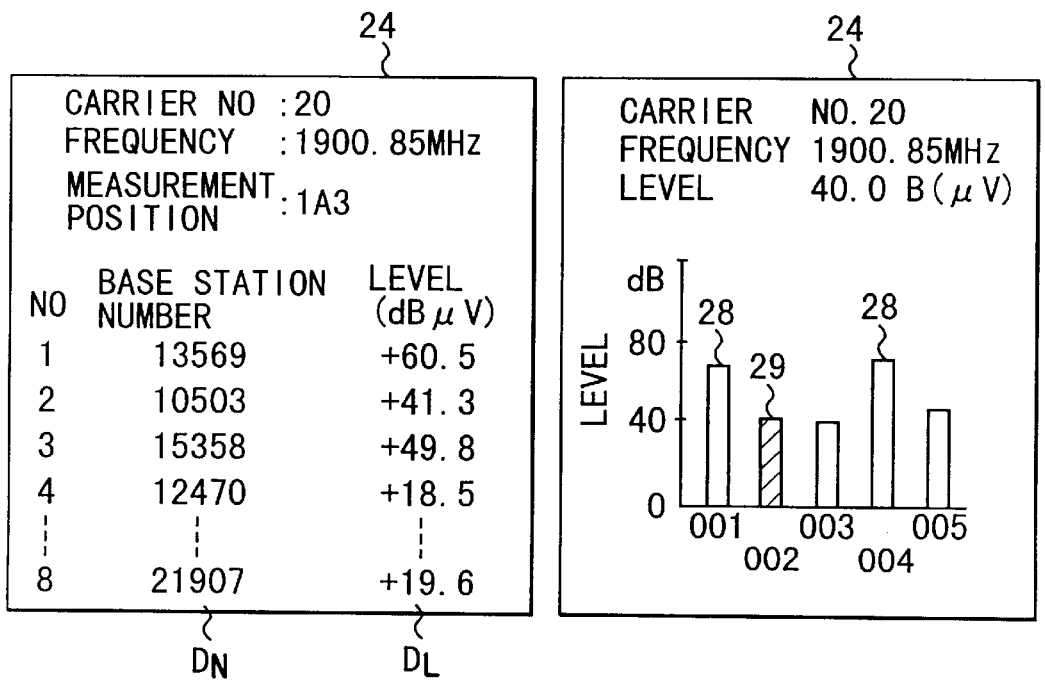
F I G. 7A                F I G. 7B

```
                                                    24

CARRIER NO  : 20

FREQUENCY   : 1900.85MHz

MEASUREMENT
POSITION    : 1A3

REFERENCE                        ERROR
NO   BASE STATION    LEVEL (dBμV)     RATE  (%)
 1   13569           +60.5            0
 2   10508           +41.8            0.1
 3   15358           +49.8            0.5
 4   12470           +18.5            3
 ⋮    ⋮                ⋮              ⋮
 8   21907           +19.6            3
```

RADIO WAVE MEASURING APPARATUS FOR DIGITAL COMMUNICATION SYSTEM

BACKGROUND OF THE INVENTION

1. Field of the Invention

The present invention relates to a radio wave measuring apparatus for a digital communication system and, more particularly, to a radio wave measuring apparatus for a digital communication system such as a personal handy-phone system (PHS) in Japan, for example. In such a digital communication system this radio wave measuring apparatus detects the received signal levels of burst signals, which are time-divisionally radiated as radio waves from base stations to mobile stations, and checks whether the signals have necessary quality.

The present invention also relates to a radio wave measuring apparatus for a digital communication system, which, in evaluating the radio wave environment of the digital communication system, can quantitatively determine the intensity of a radio wave at each measurement point and an error of a burst signal caused by the influence of a surrounding environment of that measurement point, particularly the influence of multiple reflection that cannot be determined only by the intensity.

2. Description of the Related Art

Generally, in the personal handy-phone system (PHS) as described above the range covered by one base station is relatively narrow. Therefore, in the PHS base stations are installed relatively close to each other. FIG. 9 shows the relationship between the positions of base stations 1a, 1b, 1c, 1d, and 1e and communication service ranges A, B, C, D, and E of these stations in the PHS. Assuming mobile stations 2a and 2b enter the communication service ranges E and B, respectively, these mobile stations 2a and 2b can call callees via the nearby stations 1e and 1b, respectively.

The base stations 1a to 1e in the PHS have respective base station information assigned to them. As shown in FIG. 10, the base stations 1a, 1b, 1c, 1d, and 1e radiate the information as downstream signals $a_1$, $a_2$, $a_3$, $a_4$, and $a_5$, respectively, to the mobile stations. These downstream signals $a_1$, $a_2$, $a_3$, $a_4$ and $a_5$ contain burst signals $b_1$, $b_2$, $b_3$, $b_4$, and $b_5$, respectively, which are time-divided at intervals of $\Delta t_1$ to $\Delta t_4$ with respect to the individual mobile stations for each predetermined period $T_1$.

This burst signal transmitted from each base station has ON and OFF durations for each predetermined period. The burst signal is transmitted as a burst radio wave in which various data for transmission are superposed on the ON duration. In some instances base stations output to mobile stations burst signals which have the same carrier frequency and are time-divided such that at least their ON durations do not overlap each other.

That is, the burst signals $b_1$ to $b_5$ of the downstream signals $a_1$ to $a_5$ are time-divisionally radiated so as not to interfere with each other in the air. Note that $T_0$ in FIG. 10 denotes one frame period.

In the personal handy-phone system (PHS) as described above, it is necessary to previously conduct a test in order to check whether the burst signals $b_1$ to $b_5$ of the downstream signals $a_1$ to $a_5$ radiated from the base stations 1a to 1e can be correctly received by a mobile station at positions $P_1$, $P_2$, $P_3$, ..., $P_N$, indicated by the black dots in FIG. 9, in the communication service areas in which the base stations 1a to 1e are installed.

Also, to allow the PHS to well function, it is necessary to inspect whether the radio wave environment required to allow each mobile station to fully function is attained at each measurement point in the communication service range.

To perform such test and inspection, a radio wave measuring apparatus is necessary which receives the burst signals $b_1$ to $b_5$ radiated from the base stations 1a to 1e at the measurement points $P_1$ to $P_N$, measures the received signal levels, and determines the quality of the radio wave condition.

The signals received by the radio wave measuring apparatus of this sort naturally contain the time-divided burst signals $b_1$ to $b_5$, FIG. 10, from the base stations 1a to 1e. Consequently, even if the signal levels of the burst signals $b_1$ to $b_5$ are measured, it is not possible, at the measurement positions (measurement work sites) $P_1$ to $P_N$, to immediately determine which signal level indicates which of the burst signals transmitted from the base stations 1a to 1e.

If this is the case, the measurer once measures the signal levels of the burst signals $b_1$ to $b_5$ at the measurement positions $P_1$ to $P_N$. The measurer then returns to his office and, on the basis of information such as allocated time slots between the base stations 1a to 1e, specifies the base stations corresponding to the individual burst signals whose levels were measured at the measurement sites.

Unfortunately, the signal levels of the burst signals $b_1$ to $b_5$ obtained at the measurement positions $P_1$ to $P_N$ greatly depend upon the distances to the base stations which have transmitted the burst signals corresponding to the signal levels, or upon the environmental conditions.

In the simple received signal level measurements done by the conventional radio wave measuring apparatus as described above, therefore, if a burst signal whose signal level is very low is detected, it is impossible to immediately determine whether this unusual burst signal results from the distance to the base station or from some other abnormality.

Also, in the case of the conventional radio wave measuring apparatus, when the measurer analyzes the measurement results in his office after performing the measurements on the measurement sites, he cannot ascertain the conditions of the measurement work sites. Therefore, even if some abnormality is found, he cannot exactly determine whether this abnormality is due to the presence of a radio wave obstacle somewhere in the communication service range, the reflection by a building 3, FIG. 9, or some other cause.

For example, even when the signal level is high enough to allow a mobile station to receive it, an error of the burst signal by which the transmission contents are made unrecognizable may occur due to multiple interference caused by surrounding buildings. Therefore, it is desirable that this type of a radio wave measuring apparatus not only can simply determine the signal level at a given measurement position but also can quantitatively determine an error of the burst signal at that position and thereby can make some countermeasure necessary for inspection at the next measurement position or necessary for that measurement position.

Note that the above problem is not restricted to the radio wave measurements in the PHS. As an example, the problem is similarly experienced in the radio wave measurements in digital communication systems using TDMA (Time-Division Multi Access), in which base stations and mobile stations perform communications by using different frequencies.

Known examples of the digital communication systems are PDC (Japan digital automobile telephone system), NADC (American digital automobile telephone system), GSM (European digital automobile telephone system), and DMCA (Japan digital MCA system).

In the digital communication system of the above sort, base stations as stationary stations and mobile stations as movable stations are assigned with different transmission (carrier) frequencies and divided timewise into a plurality of time slots. The base stations and the mobile stations perform data communications by using their respective corresponding time slots.

In this digital communication system, each base station repeatedly transmits a signal to the mobile stations at predetermined time intervals. Each mobile station sends back a burst-like signal (to be referred to as a burst signal hereinafter), which is turned on (ON) only for a predetermined time, each time the mobile station receives the signal from the base station.

The signal transmitted from the base station is a continuous signal or a burst signal.

A radio wave measuring apparatus, therefore, which measures the levels of the burst signals transmitted from the base and mobile stations and thereby checks the quality of the transmission radio wave condition in the digital communication system as described above also brings about problems analogous to those of the PHS mentioned previously.

A reference for this type of system is, e.g., PERSONAL DIGITAL CELLULAR TELECOMMUNICATION SYSTEM RCR STANDARD, RCR STD-27C, Fascicle 1, ISSUED APRIL 30TH, 1991, Research & Development Center for Radio Systems (RCR) in Japan.

SUMMARY OF THE INVENTION

It is, therefore, an object of the present invention to provide a new and improved radio wave measuring apparatus for a digital communication system in which the signal level of a burst signal from each base station and the corresponding base station information can be simultaneously displayed by measuring the signal level of the burst signal and reading out the base station information contained in that burst signal, it is therefore possible in the measurement site to immediately determine the base station which has transmitted the burst signal and to immediately check whether the signal level is normal or abnormal, and, if the signal level is abnormal, it is possible to determine the cause of the abnormality to some extent in the measurement work site, thereby greatly improving the performance and the operability of the radio wave measurement.

Also, the present invention has been made in consideration of the above situation and has as its object to provide a radio wave measuring apparatus in which each base station which has transmitted a burst signal can be immediately determined by measuring the signal level of the burst signal and reading out the base station information corresponding to that burst signal, and the essential quality of a radio wave can be checked by quantitatively determining an error of the burst signal, thereby making it possible to determine the cause of abnormality to some extent in the measurement work site.

According to one aspect of the present invention, there is provided a radio wave measuring apparatus for measuring field intensities of radio waves to be measured including a plurality of burst waveform signals modulated by digital data signals, which are sequentially transmitted time-divisionally from a plurality of base stations and contain transmission source base station information, comprising:

a receiver having a digital data signal demodulator for receiving the radio waves and demodulating the digital data signals;

a timing signal generator for generating timing signals for extracting the transmission source base station information in synchronism with the burst waveform signals, in accordance with the radio waves received by the receiver;

an information detector for receiving the digital data signals output from the digital data signal demodulator and the timing signals output from the timing signal generator and detecting received information containing the transmission source base station information of the burst waveform signals;

a level measurement unit for detecting field intensities of the burst waveform signals contained in the radio waves received by the receiver; and a data processing unit for outputting the field intensities of the burst waveform signals detected by the level measurement unit and the transmission source base station information detected by the information detector in a one-to-one correspondence with each other, on the basis of the timing signals from the timing signal generator.

According to another aspect of the present invention, there is provided a radio wave measuring apparatus for sequentially receiving burst signals time-divisionally radiated from a plurality of base stations and modulated by digital data signals containing base station information indicating transmission source base stations, and measuring received signal levels of the burst signals radiated from the base stations at a reception position, comprising:

a demodulator for sequentially receiving and demodulating the burst signals radiated from the base stations, and outputting demodulated digital data signals;

a timing signal generator for outputting a first timing signal for extracting the base station information and a second timing signal for detecting the received signal levels of the burst signals radiated from the base stations, upon receiving the demodulated digital data signals output from the demodulator;

a data extraction unit for extracting the base station information from the demodulated digital data signals output from the demodulator, upon receiving the first timing signal from the timing signal generator;

a level detector for detecting the received signal levels of the burst signals radiated from the base stations, upon receiving the second timing signal from the timing signal generator;

a data memory for storing the received signal levels detected by the level detector and the base station information extracted by the data extraction unit in a one-to-one correspondence with each other;

a display unit for displaying various information; and a data processing unit for reading out the received signal levels and the base station information stored in a one-to-one correspondence with each other in the data memory, and causing the display unit to display, with elapse of a reception time, the readout received signal levels and base station information in a one-to-one correspondence with each other.

According to still another aspect of the present invention, there is provided a radio wave measuring apparatus comprising:

a receiver for receiving burst waveforms of radio waves to be measured which are time-divisionally transmitted from a plurality of base stations and includes a plurality of predetermined information containing base station information indicating transmission source base stations and information necessary for transmission;

a timing generator for generating first and second timing signals synchronized with the burst waveforms contained in the radio waves received by the receiver;

an information detector for extracting the predetermined information contained in the radio waves received by the receiver, upon receiving the first timing signal from the timing generator;

a level measurement unit for measuring levels of the radio waves received by the receiver, upon receiving the second timing signal from the timing generator;

a determination unit for determining validity of the radio waves received by the receiver for each burst waveform, on the basis of the predetermined information extracted by the information detector; and a data processing unit for outputting determination results of the determination unit and the levels of the radio waves measured by the level measurement unit in a one-to-one correspondence with the base station information contained in the predetermined information extracted by the information extraction unit.

According to still another aspect of the present invention, there is provided a radio wave measuring apparatus comprising:

a measurement unit for sequentially receiving burst waveform signals of radio waves time-divisionally radiated from a plurality of base stations and modulated by digital data signals containing transmission source base station information, measuring received signal levels of the burst waveform signals radiated from the base stations at a reception position, and extracting the base station information;

a data memory for storing the base station information and the received signal levels of the burst waveform signals radiated from the base stations;

a data processing unit, including a processor, for combining individual data stored in the data memory to selectively process and output the data in a display format desired by a user; and display means, connected to the processor, for displaying the base station information and the received signal levels of the burst waveform signals radiated from the base stations at at least a certain reception position in a one-to-one correspondence.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a view showing the displayed contents of a display unit in the apparatus of the first embodiment;

FIGS. 7A and 7B are views showing the displayed contents of the display unit in the apparatus of the first embodiment;

DETAILED DESCRIPTION OF THE PREFERRED EMBODIMENTS

Figure 1:
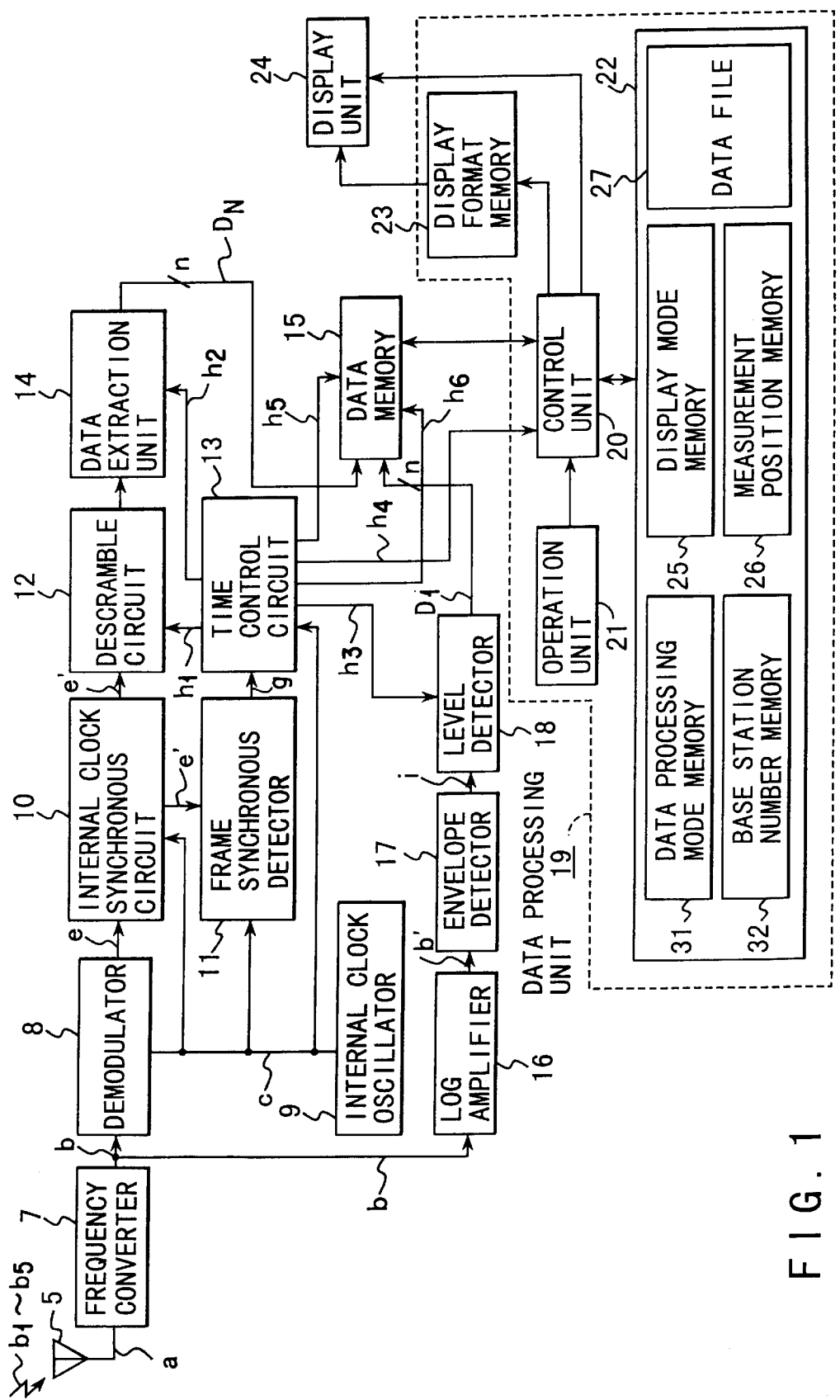
FIG. 1 is a block diagram showing the schematic arrangement of a radio wave measuring apparatus according to the first embodiment of the present invention.

Reference will now be made in detail to the presently preferred embodiments of the invention as illustrated in the accompanying drawings, in which like reference characters designate like or corresponding parts throughout the several drawings.

FIG. 1 is a block diagram showing the schematic arrangement of a radio wave measuring apparatus according to the first embodiment of the present invention. This radio wave measuring apparatus measures, in such a way as will be described later, the level ($D_1$) of a received signal a containing the burst signals $b_1$, $b_2$, $b_3$, $b_4$, and $b_5$, FIG. 10, radiated from the base stations $1a$ to $1e$, FIG. 9, at the positions $P_1, P_2, \ldots, P_N$ in the communication service ranges covered by the stations $1a$ to $1e$.

Figure 5:
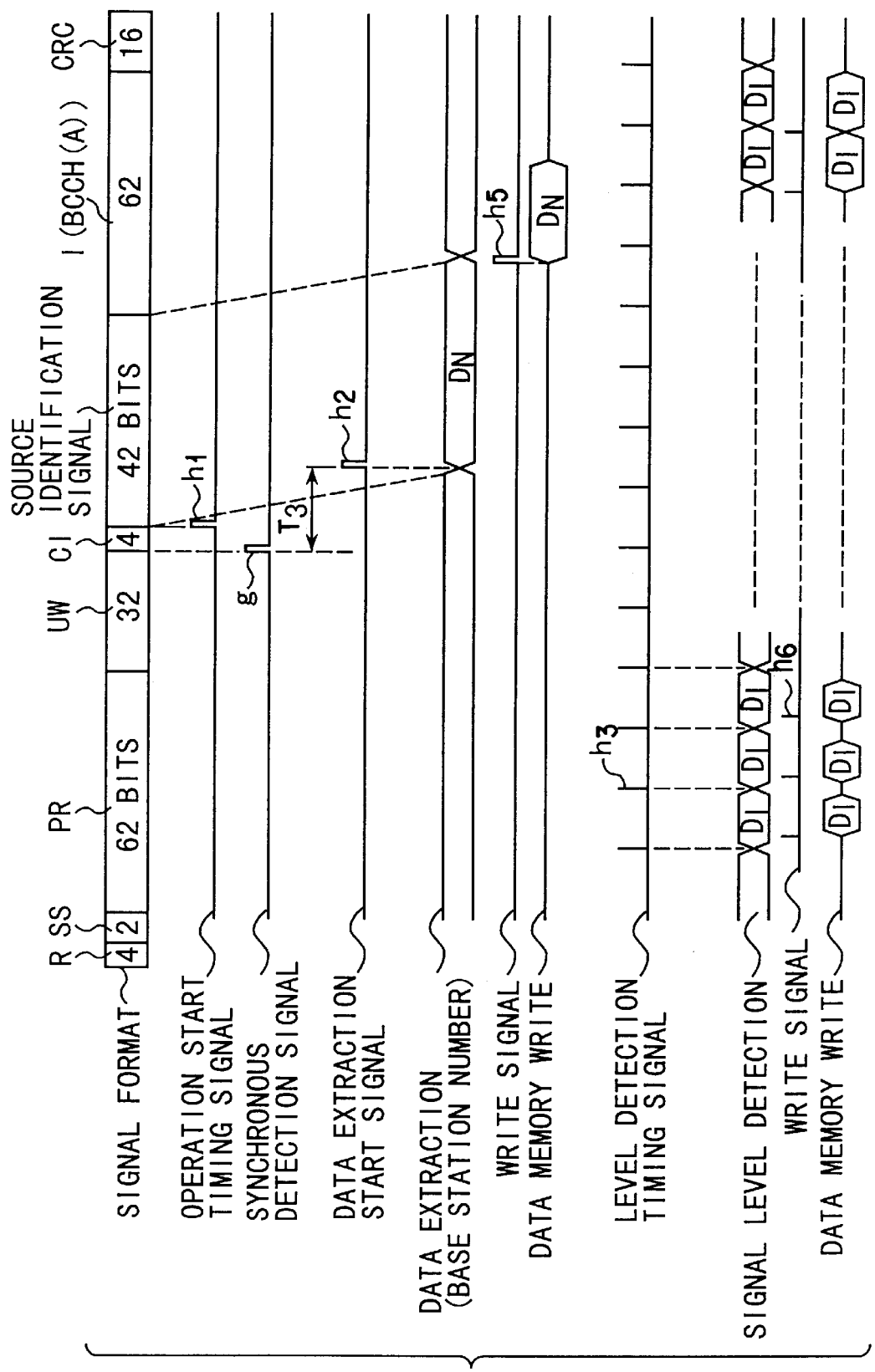
FIG. 5 is a timing chart showing the relationship between the signal format and the individual signals in the apparatus of the first embodiment.

FIG. 5 is a timing chart showing the relationship between the bit arrangement as a signal format of a transmission frame constituting the burst signals $b_1$ to $b_5$ contained in the downstream signals $a_1$ to $a_5$ radiated from the base stations $1a$ to $1e$ in the PHS and the timings of the respective corresponding signals. In this signal format, 4 ramp bits R are set in the first position, a 2-bit start symbol SS is set in the second position, 62 preamble bits PR are set in the third position, a 32-bit unique word UW is set in the fourth position, and a 4-bit channel type CI is set in the fifth position. Additionally, a 42-bit source identification code is set in the sixth position as base station information, a 62-bit I(BCCH(A)) is set subsequently, and 16 error correction bits CRC are set finally.

The 32-bit unique word UW is a common bit array for all of the burst signals $b_1$ to $b_5$. Therefore, the time position of the transmission frame is specified by detecting this bit array in a demodulated digital data signal e.

In the 42-bit source identification signal, base station information for specifying the transmission source base stations $1a$ to $1e$ of the burst signals $b_1$ to $b_5$ is set.

A carrier wave is subjected to quadrature phase modulation (QPSK) using the digital signal e constituted by the transmission frame with the above bit arrangement and radiated as the burst signals $b_1$ to $b_5$ from the base stations $1a$ to $1e$.

In the radio wave measuring apparatus shown in FIG. 1, the burst signals $b_1, b_2, \ldots, b_5$ of, e.g., 1.9 GHz radiated in the air from the base stations $1a$ to $1e$ are received by a frequency converter 7, as the received signal a, via an antenna 5. In the frequency converter 7 the frequency of the signal a is converted into a low frequency of 1.8 MHz which is suitable for signal analysis. The received signal, b, having this frequency is applied to a demodulator 8.

As this demodulator 8 it is possible to use a commercially available IC, e.g., "Adaptive Carrier Tracking (ACT) Demodulation LSI NLC5010F" manufactured by "NTT Electronics Technology Corporation (NEL) TOKYO JAPAN".

Figure 4:
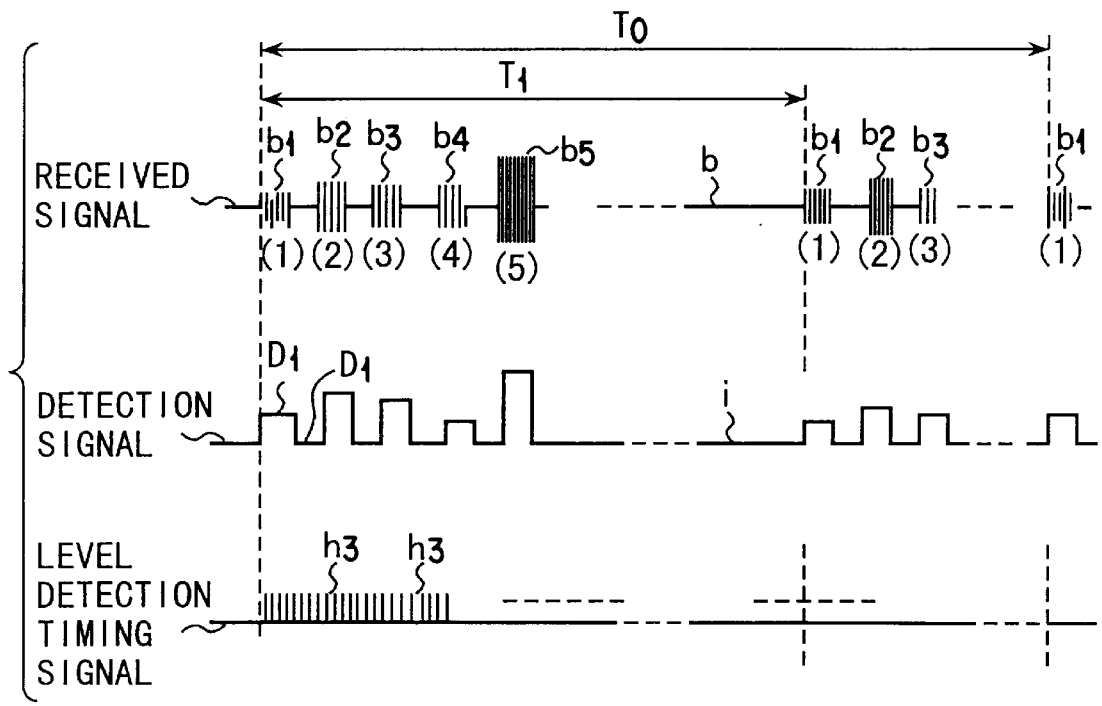
FIG. 4 is a timing chart showing the operation of the apparatus of the first embodiment.

As in FIG. 4, the output received signal b from the frequency converter 7 contains the burst signals $b_1, b_2, \ldots, b_5$ which are time-divisionally transmitted from the base stations $1a$ to $1e$.

The demodulator 8 demodulates the frequency-converted burst signals $b_1, b_2, \ldots, b_5$ into the original digital data signal e by using an output clock signal c from an internal clock oscillator 9, and sends the demodulated signal to an internal clock synchronous circuit 10. The internal clock synchronous circuit 10 synchronizes the input digital data signal e with the output clock signal c from the internal clock oscillator 9. The clock-synchronized digital data signal, e', is applied to a descramble circuit 12 and a frame synchronous detector 11.

As this frame synchronous detector 11 a commercially available IC, e.g., "64-bit Digital Correlator" manufactured by "LOGIC DEVICES INCORPORATED", can be used.

The frame synchronous detector 11 comprises a shift register having the same number, 32, of register stages as the number of bits of the unique word UW in the signal format described above, and a memory for storing the bit pattern of the 32-bit unique word UW. The frame synchronous detector 11 inputs each bit data of the digital data signal e' to the first register of the shift register and sequentially shifts the data to the subsequent registers. At the timing at which the bit pattern stored in each of the 32 registers of the shift register agrees with the bit pattern stored in the memory, the frame synchronous detector 11 sends a synchronous detection signal q to a time control circuit 13 in the subsequent stage.

When a time corresponding to the four bits of the channel type CI in the signal format elapses from the input time of a synchronous detection signal q, the time control circuit 13 sends an operation start timing signal $h_1$ to the descramble circuit 12. Upon receiving the operation start timing signal $h_1$, the descramble circuit 12 descrambles the 120 bits following the source identification code in the digital data signal e', returning the signal into an immediately interpretable data string. Note that, if necessary, the time required for the descramble is delayed, and after the descramble the digital data signal e' is sent to a data extraction unit 14 in the subsequent stage.

The method of this descramble can be accomplished by, e.g., the techniques shown in FIGS. 4.2.24 and 4.2.25 of STANDARD RCR-STD-28 of PHS mentioned earlier.

Also, as illustrated in FIG. 5, the time control circuit 13 outputs a data extraction start timing signal $h_2$ to the data extraction unit 14 when time $T_3$ which is the time corresponding to the four bits of the channel type CI plus the time required for the descramble elapses from the input timing of the synchronous detection signal q.

As in FIG. 5, upon receiving the data extraction start timing signal $h_2$ the data extraction unit 14 reads out the 42 bits of the source identification code from the digital data signal e' as a base station number $D_N$. That is, the data extraction unit 14 extracts the 42-bit serial base station number $D_N$ of the source identification code and applies an n-bit parallel base station number $D_N$ to the first input terminal of a data memory 15 in the following stage.

The time control circuit 13 also sends a level detection timing signal $h_3$ to a level detector 18 in synchronism with the clock signal c from the internal clock oscillator 9.

Meanwhile, the output received signal b from the frequency converter 7, which contains the burst signals $b_1, b_2, \ldots, b_5$, is applied to the demodulator 8 and a logarithmic amplifier (LOG amplifier) 16 where the signal is logarithmically converted. The logarithmically converted received signal, b', containing the burst signals $b_1, b_2, \ldots, b_5$ is envelope-detected by an envelope detector 17. The detection signal, i, containing the envelope-detected burst signals $b_1, b_2, \ldots, b_5$ is applied to the level detector 18.

As shown in FIG. 4, in response to the level detection timing signal $h_3$ from the time control circuit 13 the level detector 18 detects the signal level, $D_1$, of the envelope-detected detection signal i. The level detector 18 has an A/D conversion function for applying the detected signal level $D_1$ as n-bit parallel data to the second input terminal of the data memory 15.

At the timings at which the base station number $D_N$ and the signal level $D_1$ are applied to the respective input terminals of the data memory 15, the time control circuit 13 sends write signals $h_5$ and $h_6$ for writing the base station number $D_N$ and the signal level $D_1$, respectively, to the data memory 15. After predetermined numbers of base station numbers $D_N$ and signal levels $D_1$ are written in the data memory 15, in order to transfer these data to a data file 27 of a data processing unit 19 the time control circuit 13 sends a transfer timing signal $h_4$ to a control unit 20 of the data processing unit 19.

The data processing unit 19 is constituted by a kind of a computer (CPU). The control unit 20 for executing various types of information processing is connected to an operation unit 21 through which an operator enters various display modes or data processing modes and performs various operations. The control unit 20 is also connected to a storage unit 22, a display format memory 23, the data memory 15 described above, and a display unit 24 constituted by a liquid crystal display or the like device.

The storage unit 22 incorporates a display mode memory 25 for storing a display mode which is set by the operator through the operation unit 21, a measurement position memory 26, a data processing mode memory 31, a base station number memory 32, and the data file 27.

The display modes which the operator can select in this radio wave measuring apparatus are "time axis display mode" and "processing result display mode". The "processing result display mode" includes four signal level display orders, i.e., "reception order", "signal level order", "base station number order", and "designated base station order", and two display forms, i.e., "graphic display" and "numerical display".

The data processing modes which are set in the data processing mode memory 31 upon being designated by the operator through the operation unit 21 include three modes, i.e., "mean value processing", "median value processing", and "maximum value processing".

The display format memory 23 stores display formats corresponding to the individual display modes described above.

The measurement position memory 26 stores the present measurement positions, $P_1, P_2, \ldots, P_N$, which the operator enters through the operation unit 21.

The control unit 20 which has received the transfer timing signal $h_4$ described above reads out the display mode from the display mode memory 25, prior to transferring the data. If the display mode is the time axis display mode, the control unit 20 transfers the contents of the data memory 15 to the data file 27. If the display mode is the processing result display mode, the control unit 20 reads out the data processing mode from the data processing mode memory 31 and, in accordance with the readout processing mode, transfers the data-processed signal level $D_L$ and the base station number $D_N$ to the data file 27.

In all data processing, the control unit 20 first calculates the levels $L_1, L_2, \ldots, L_5$ of the burst signals $b_1, b_2, \ldots, b_5$ received from the base stations 1a to 1e. More specifically, each level is calculated by averaging out the signal levels $D_1$ of each burst.

Of the signal levels $D_1$ written in the data memory 15, the control unit 20 determines the signal levels $D_1$ to be averaged out for each burst from the relative positional (address) relationship between the base station numbers $D_N$ and the signal levels $D_1$ written in the data memory 15.

In the mean value processing, the control unit 20 calculates a mean value $D_L$ of the burst signal levels $L_1, L_2, \ldots, L_5$ during a defined time $T_0$ in the received signal b, FIG. 4, for each base station. In the median value processing, the control unit 20 calculates a median value $D_L$ for each base station. In the maximum value processing, the control unit 20 calculates a maximum value $D_L$ for each base station.

In the processing result display mode, the control unit 20 transfers the data-processed signal level $D_L$ and the base station number $D_N$ of each base station to the data file 27.

Figure 2:
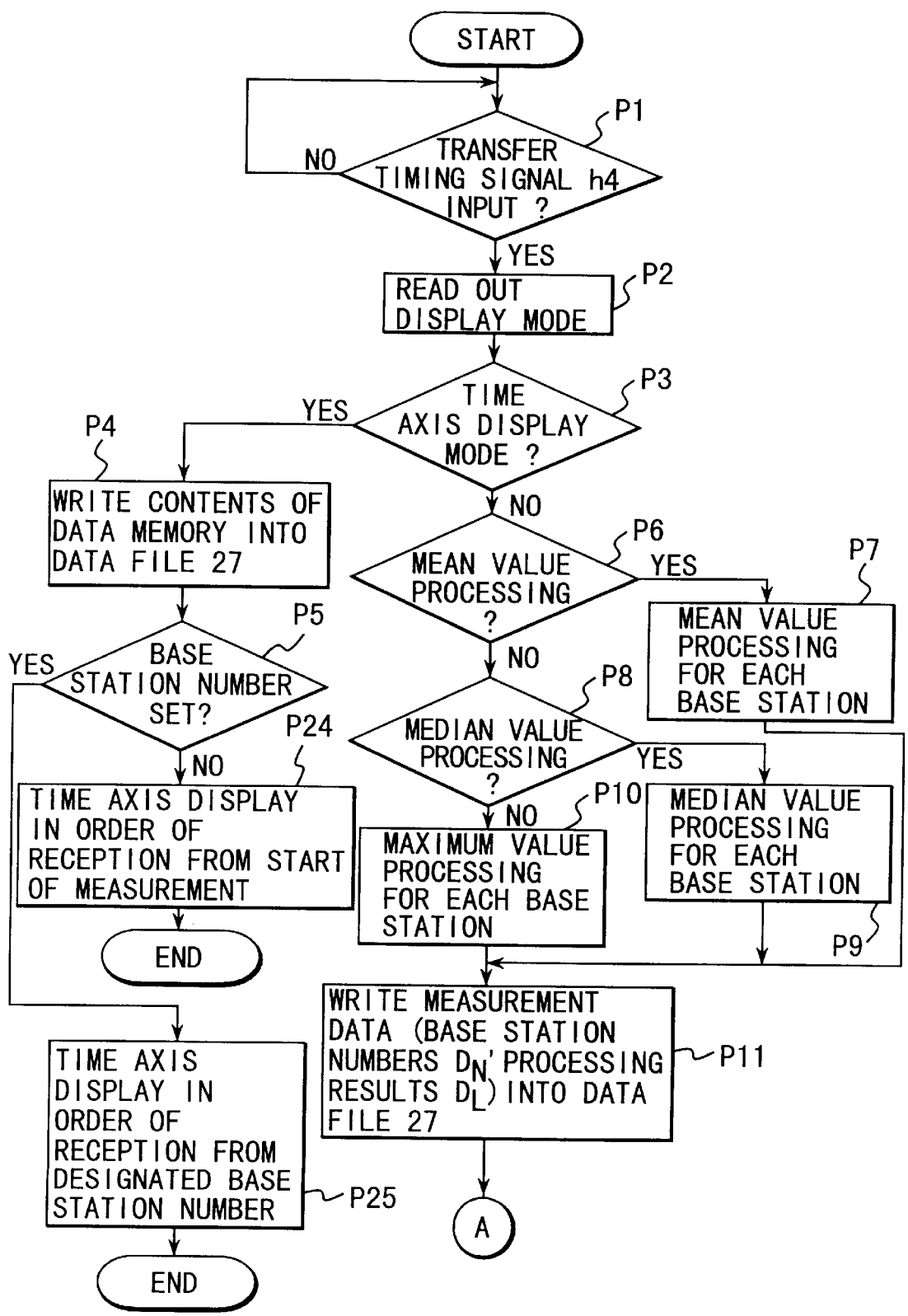
FIG. 2 is a flow chart showing the operation of the apparatus of the first embodiment.
Figure 3:
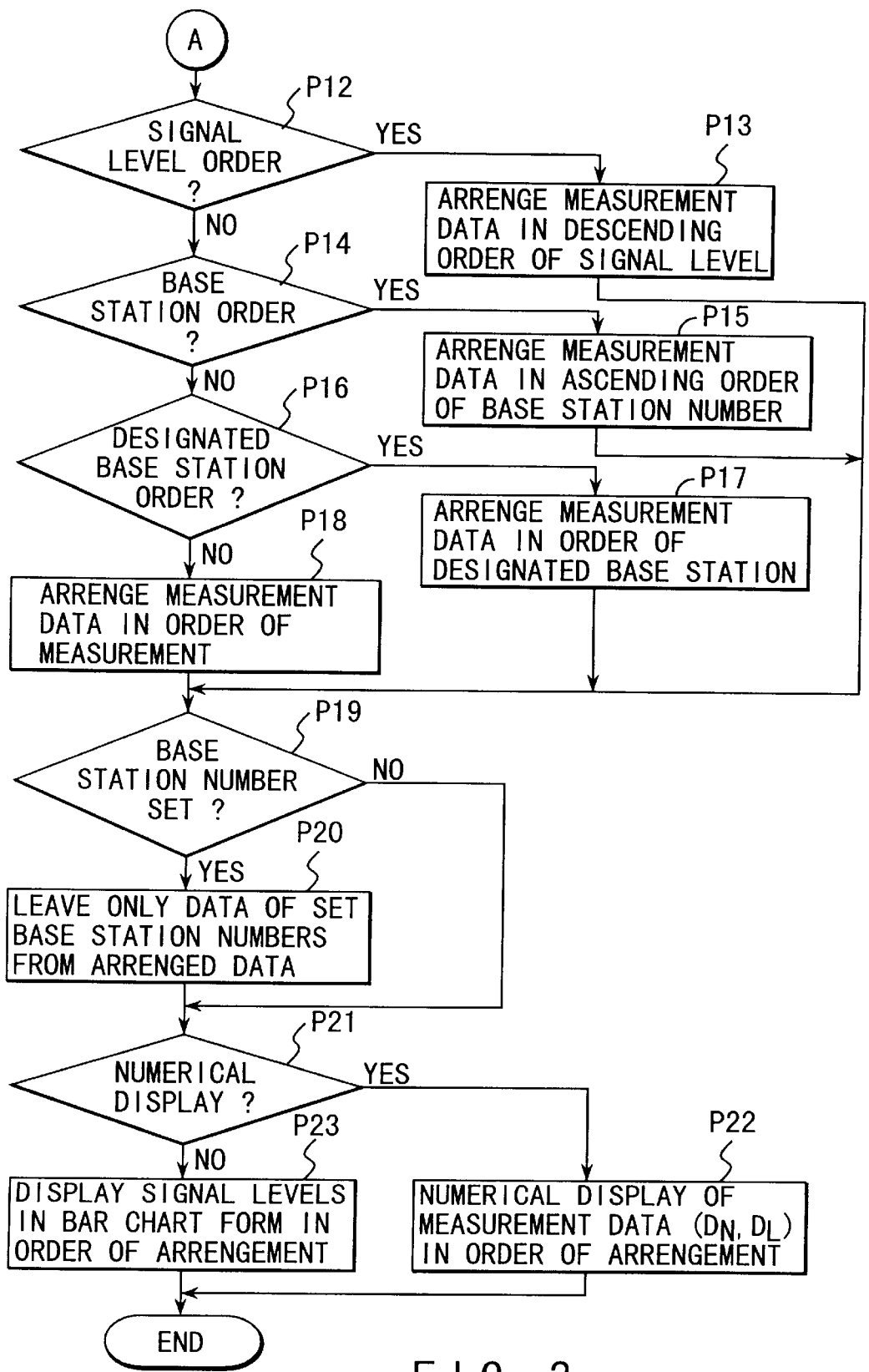
FIG. 3 is a flow chart showing the operation of the apparatus of the first embodiment.

The control unit 20 of the data processing unit 19 is so programmed as to perform data processing and display processing based on the signal levels $D_1$ of the burst signals $b_1$ to $b_5$ detected by the level detector 18 and the base station numbers $D_N$ of the burst signals $b_1$ to $b_5$ extracted by the data extraction unit 14, in accordance with the flow charts shown in FIGS. 2 and 3.

When the flow shown in FIG. 2 is started and a transfer timing signal $h_4$ is input from the time control circuit 13 in program step P1, the display mode chosen by the operator is read out from the display mode memory 25 of the storage unit 22 (step P2).

If the display mode is the time axis display mode in step P3, the contents of the data memory 15 are written and stored in the data file 27 (step P4). If in step P5 no base station number is set in the base station number memory 32 which is provided to enable display from an arbitrary base station number $D_N$, the measurement data $D_1, \ldots, D_N$ are displayed, as they are developed on the time axis, on the display unit 24 in the order of reception by using the display format corresponding to the set display mode stored in the display mode memory 25 (step P24).

If in step P5 a base station number is set in the base station number memory 32 through the operation unit 21, the measurement data are displayed as they are developed on the time axis in the order of reception from the timing at which the set base station number is received (step P25). Simultaneously, the measurement positions P stored in the measurement position memory 26 also are displayed.

If the display mode is not the time axis display mode in step P3, the control unit 20 determines that the display mode is the processing result display mode, and the flow advances to step P6. If the data processing mode is the mean value processing in step P6, the control unit 20 calculates the mean value $D_L$ of the burst signal levels for each base station within the defined time $T_0$ (step P7). If the data processing is the median value processing in step P8, the control unit 20 calculates the median value $D_L$ of the burst signal levels for each base station within the defined period $T_0$ (step P9).

On the other hand, if the data processing is not the median value processing in step P8, the control unit 20 determines that the data processing is the maximum value processing. Consequently, the control unit 20 calculates the maximum value $D_L$ of the burst signal levels for each base station within the defined period $T_0$ (step P10).

In step P11, the base station numbers $D_N$ of the individual base stations and the data-processed signal levels $D_L$ corresponding to these base stations are written in the data file 27.

If the display mode is the "signal level order" in step P12 in FIG. 3, the measurement data processed for each base station are rearranged in the descending order of the signal level $D_L$ (step P13). If the display mode is the "base station number order" in step P14, the processed measurement data are rearranged in the ascending order of the base station number $D_N$ (step P15). If the display mode is the "designated base station order" in step P16, the processed measurement data are rearranged in the base station order designated by the operator through the operation unit 21 (step P17).

If the display mode is not the "designated base station order" in step P16, the control unit 20 determines that the display mode is a common "reception order". Accordingly, the processed measurement data are arranged in the order of reception (step P18).

If a base station number is designated in step P19, the flow advances to step P20 to leave behind only data of the designated base station numbers from the arranged data. If no base station number is set in step P19, the flow advances to step P21.

In step P21, the control unit 20 checks whether the display form is the "graphic display" or the "numerical display". If the display form is the "numerical display", the flow advances to step P22. In step P22, the measurement data $(D_L, D_N)$ are displayed on the display unit 24, in accordance with the previously set order, by using the display format corresponding to the set display mode stored in the display mode memory 25. In step P22 the measurement positions P stored in the measurement position memory 26 also are displayed.

FIG. 7A shows a practical example of the displayed contents of the display unit 24 in the common "reception order" mode and in the "numerical display" mode. The base station numbers $D_N$ and the signal levels $D_L$ are simultaneously displayed in the ascending order of reception time number NO.

If the display form is the "graphic display" in step P21 in the flow chart of FIG. 3, the flow advances to step P23. In step P23, the signal levels $D_L$ are displayed on the display unit 24 in the form of a bar chart in accordance with the previously set order. At the same time, in the vicinities of the individual bars of the bar chart characters indicating the corresponding base station numbers $D_N$ are displayed.

FIG. 6 shows a practical example of the displayed contents of the display unit 24 in the time axis display mode. Referring to FIG. 6, the signal levels $D_L$ obtained by detecting the envelope-detected detection signal i, FIG. 4, at the timing of the level detection timing signal $h_3$ are displayed in the order of detection time, and simultaneously the corresponding base station numbers $D_N$ are displayed. The measurement position and the frequency also are displayed.

In FIG. 6, the abscissa indicates the time axis for the received signal a, and the ordinate represents the signal level (dB). As in FIG. 6, base station numbers 13519, 10503, . . . , corresponding to the burst signal waveforms indicated by the signal level $D_1$ are displayed.

Figure 8:
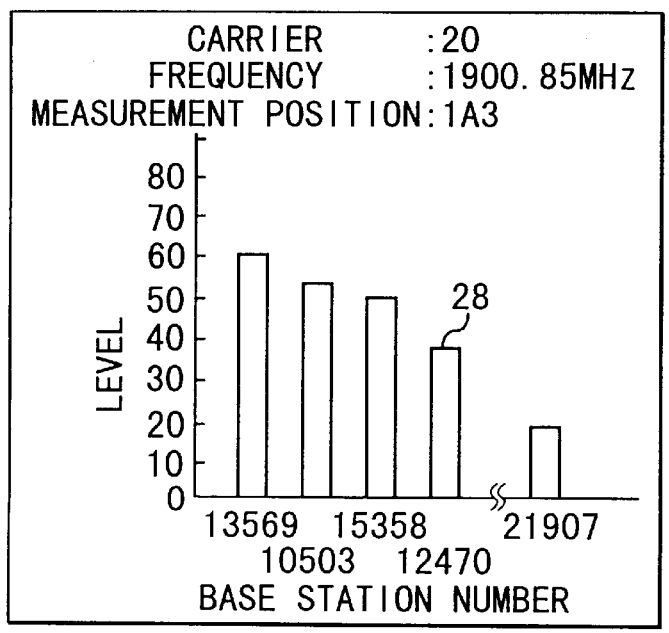
FIG. 8 is a view showing the displayed contents of the display unit in the apparatus of the first embodiment.

FIG. 8 shows the displayed contents of the display unit 24 when the display mode is the "signal level order" and the display form is the "graphic display". Referring to FIG. 8, the signal level $D_L$ is displayed in the form of a bar chart 28, and the bars of the bar chart 28 are arranged in the descending order. FIG. 7B shows the displayed contents of the display unit 24 when the display mode is the "base station number order" and the display form is the "graphic display". Referring to FIG. 7B, the signal level $D_L$ is displayed in the form of a bar chart 28 following the order of base station numbers 001, 002, 003, . . . . Also, in this embodiment if the operator designates a specific base station number $D_N$ (=002) through the operation unit 21, a bar 29 corresponding to the base station number $D_N$ (=002) is emphasized by highlighting or flashing, and a signal level $D_L$ (=40 dB) of that base station number $D_N$ (=002) is displayed in the upper portion of the screen.

Figure 9:
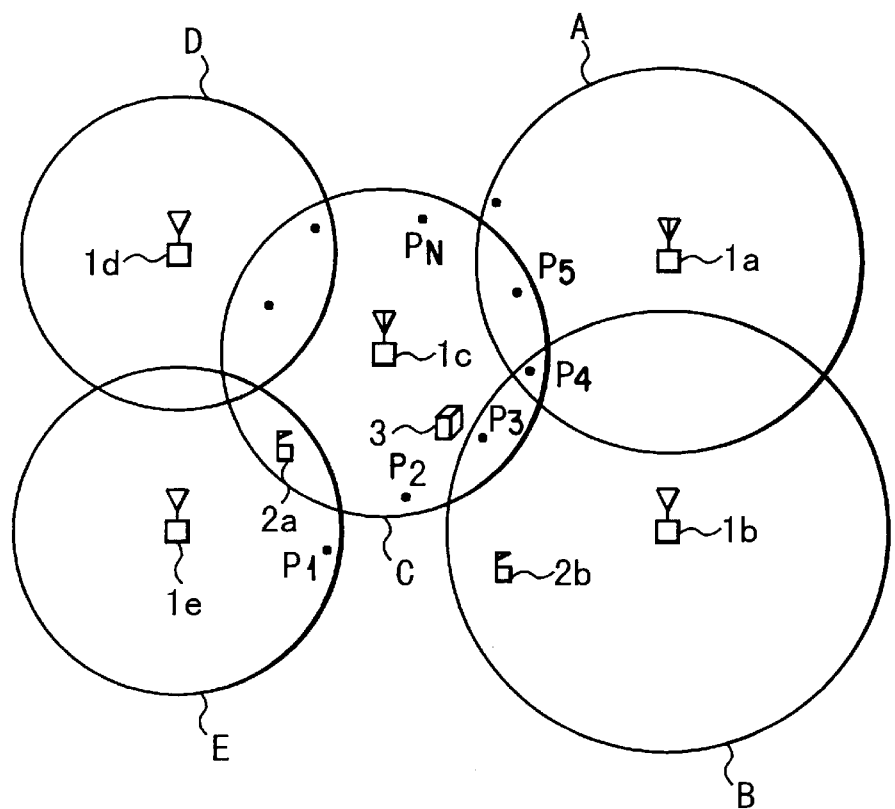
FIG. 9 is a view showing the communication service ranges in a personal handy-phone system.

The operator installs the radio wave measuring apparatus with the above arrangement at any of the measurement positions $P_1$ to $P_N$ in the communication service areas illustrated in FIG. 9, and enters information of this measurement position through the operation unit 21. The operator then sets a desired display mode, display form, and the like factor.

When the above preparation work is completed and the measurement is started, the burst signals $b_1, b_2, \ldots, b_5$ from the base stations 1a to 1e are received, and the signal levels $D_1$ and the transmission source base station numbers $D_N$ are detected as described previously.

In the processing result display mode, the data-processed signal levels $D_L$ and the corresponding transmission source base station numbers $D_N$ are obtained from the detected signal levels $D_L$ and the transmission source base station numbers $D_N$ in accordance with the data processing mode. The measurement data consisting of the signal levels $D_L$ and the base station numbers $D_N$ are collectively displayed on the display unit 24.

The operator, therefore, can instantly recognize the signal levels $D_L$ and the corresponding transmission source base stations 1a to 1e only by monitoring the display screen of the display unit 24. In this manner, at each of the measurement positions $P_1$ to $P_N$ the signal levels $D_L$ of the individual base stations 1a to 1e are obtained from the burst signals radiated from these base stations, and the obtained signal levels $D_L$ are displayed. This permits the operator to recognize the mean value, the median value, or the maximum value of each base station in the measurement period at the measurement position (measurement work site).

As illustrated in FIG. 6, the signal level $D_1$ is displayed as it is developed on the time axis. For example, if a radio wave reflected by the building 3, FIG. 9, is received, a reception level waveform 30 of the reflected wave appears between other reception level waveforms 31 at normal time axis positions, or partially overlaps the normal reception level waveform 31.

According to the radio wave measuring apparatus of the first embodiment of the present invention, therefore, the operator can easily specify the reflected radio wave state or the like condition on the display screen. Consequently, in the measurement work site the operator can relatively easily determine the cause of a reception failure of a normal burst signal which results from a reflected radio wave.

Additionally, in the radio wave measuring apparatus of the present invention the ordinate of the display unit 24 indicates the signal level. This allows the operator to roughly assess the signal level of a burst signal.

In the radio wave measuring apparatus according to the first embodiment of the present invention as described above, the signal level of a burst signal is measured and the digital base station information contained in that burst signal is read out. This makes it possible to simultaneously display the signal levels of the burst signals from the base stations and the corresponding base station information such as base station numbers. Consequently, in the measurement site the operation can immediately identify the transmission source base station of each burst signal and check whether each signal is normal or abnormal on the display screen. Also, if the signal level is abnormal, the operator can identify and analyze the cause of the abnormality to some extent in the measurement work site. This greatly improves the measurement performance and the operability.

Figure 11:
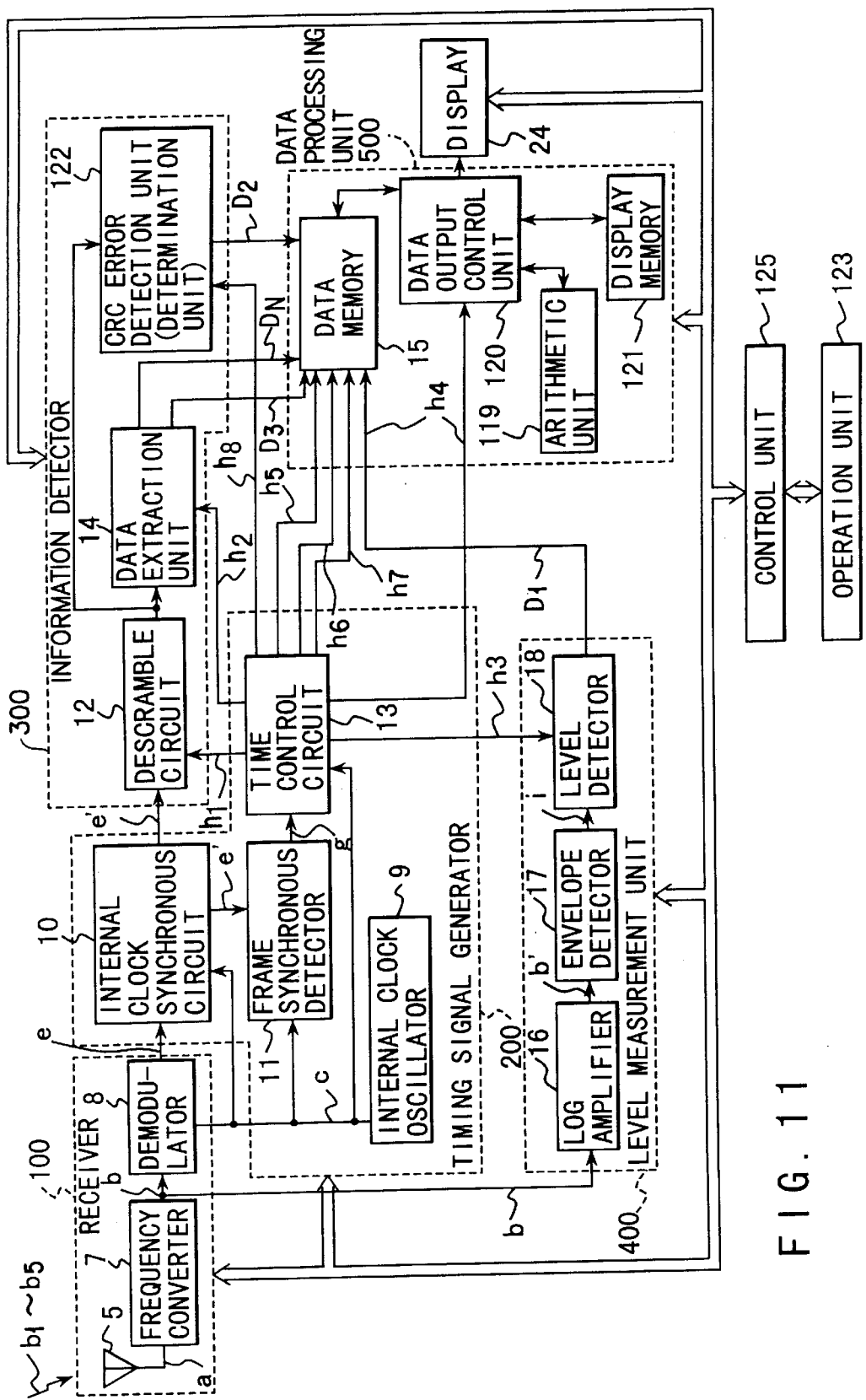
FIG. 11 is a block diagram sowing the schematic arrangement of a radio wave measuring apparatus according to the second embodiment of the present invention.

FIG. 11 is a block diagram showing the schematic arrangement of a radio wave measuring apparatus according to the second embodiment of the present invention. In FIG. 11, control or data exchange performed by an operation unit 123 and a control unit 125 with respect to other major components is indicated by a double-line bus. The flows of signals, data, and timing signals between the main components required to understand the present invention are indicated by solid lines, even if the signal is a multi-bit one.

Note that for some parts of the second embodiment which operate in similar ways as in the first embodiment it is assumed that a reference is made to the description in the first embodiment, and a detailed description thereof will be omitted in some cases.

To begin with, a summary of the second embodiment in FIG. 11 will be described below.

(1) A timing signal generator 200 outputs a timing signal q which is synchronized with the burst waveform of a radio wave transmitted from each base station. On the basis of this timing signal q, a level measurement unit 400 measures the level of the received radio wave. An information detector 300 extracts base station information necessary to specify the base station from digital data contained in the burst signal.

(2) A determination unit 122 determines whether various digital data contained in the burst signal are valid.

(3) A data processing unit 500 outputs the measured level obtained by the level measurement unit and the determination result obtained by the determination unit, corresponding to the base station information for specifying the base station extracted by the information detector 300.

The apparatus of the present invention can further include an arithmetic unit 119 for obtaining a burst error rate t in a measurement time, in order to quantitatively check the influence of, e.g., multiple interference.

An example of the burst error calculated by the arithmetic unit 119 is as follows. That is, assuming the theoretical number of burst signals within a set measurement time is r (the measurement time and the burst repetition time are known), the burst number which cannot be synchronously detected by the timing signal generator 200 is $P_1$ (the number of bit errors), and the burst number found to be errors by the determination unit 122 is $P_2$, the burst error rate t is calculated by Equation (1) below:

$$T = \{r - (p_1 + p_2)\}/r \qquad (1)$$

The configurations of the main parts will be described below.

a) In a receiver 100, a frequency converter 7 converts the frequency of a signal received by an antenna 5 into a low frequency, and a demodulator 5 demodulates the low-frequency signal into digital data before the transmission.

b) In the information detector 300, a descramble circuit 12 descrambles the digital data demodulated by the demodulator 8, and a data extraction unit 14 extracts various data (particularly the data from the source identification code in the signal format in FIG. 5).

c) In the timing signal generator 200, a synchronous frame detector 11 receives the descrambled data (e.g., the 32-bit unique word UW in the signal format in FIG. 5) from the data demodulated by the demodulator 8, and compares the received data with the bit pattern of that data previously stored. If the two data agree with each other, the synchronous frame detector 11 outputs a synchronous detection signal q. If the two data do not agree, the synchronous frame detector 11 does not output the synchronous detection signal q since a bit error has taken place. On the basis of the synchronous detection signal q, a time control circuit 13 outputs timing signals $h_1$ to $h_8$ which other major components require.

d) In the information detector 300, the digital data is demodulated by the demodulator 8 and descrambled by the descramble circuit 12. Thereafter, the data extraction unit 14 extracts various data (particularly the data from the source identification code in the signal format in FIG. 5) at the timing of the timing signal $h_2$.

e) The determination unit 122 is more specifically a CRC error detection unit. This CRC error detection unit can determine the validity of the digital data by quantitatively checking CRC (Cyclic Redundancy Check) errors for various digital data contained in the burst signal.

f) The level measurement unit 400 logarithmically amplifies the received signal, performs envelope detection for the received signal, and detects the level of the received signal at the timing of the timing signal $h_3$.

g) The data processing unit 500 includes a data memory 15. In response to the timing signals $h_5$, $h_6$, and $h_7$, the data processing unit 500 causes the data memory 15 to store the levels and the determination results corresponding to the base station information, and outputs the data.

i) A display unit 24 displays the data which is processed into various display formats in the data processing unit 500 and which the operator can readily recognize.

The radio wave measuring apparatus with the above arrangement receives the burst signals, time-divisionally radiated from the individual base stations. The timing signal generator 200 generates a synchronous detection signal q synchronized with the burst. On the basis of this synchronous detection signal q, the level measurement unit 400, the information detector 300, and the determination unit 122 operate. Consequently, it is possible to recognize the measured level of a burst signal at a certain timing and the validity of the digital data, corresponding to the base station which has radiated the burst signal.

Additionally, since the validity of the digital data also is determined, it is possible to quantitatively check an error of the burst signal caused by an influence, such as multiple interference, that cannot be determined only by the level of a radio wave at the measurement position. Consequently, an essential quality of the received radio wave can be evaluated.

The radio wave measuring apparatus of the second embodiment shown in FIG. 11 measures the level of a burst signal radiated from a designated base station at, for example, each of the positions $P_1, P_2, P_3, \ldots, P_N$ within the communication service ranges covered by the base stations 1a to 1e shown in FIG. 9. At the same time, the apparatus calculates the burst error rate t defined by Equation (1) and outputs and displays both the value of the level of the radio wave radiated from the designated base station and the calculated burst error rate t.

With these displayed values, the measurer can evaluate and determine the quality of the radio wave radiated from the designated base station at each of the positions $P_1, P_2, P_3, \ldots, P_N$.

The details of the configuration of the radio wave measuring apparatus according to the second embodiment shown in FIG. 11 and the procedure from the level measurement of the burst signal radiated from the designated base station to the calculation and display of the burst error rate t will be described below. Note, as mentioned previously, that description of parts of the second embodiment which have the same functions as in the first embodiment will be omitted in some cases.

An operation unit 123 is constituted by a panel, keys, knobs, and the like parts. By using this operation unit 123, the operator designates "measurement time", and "base station identification number" and "reception frequency" of a base station to be evaluated which transmits a radio wave.

The set value of "measurement time" means a time interval during which a burst signal radiated from the designated base station is received and measured. As indicated by $T_0$ in FIG. 4, this measurement time is longer than the burst repetition period $T_1$. The "base station identification number" is base station information corresponding to the 42-bit source identification code in the sixth position of the transmission frame which constitutes the burst signal in FIG. 5. The "reception frequency" is the carrier frequency of the radio wave radiated from the designated base station.

The control unit 125 consists of a CPU, a ROM, and a RAM. The control unit 125 sets the "reception frequency" set by the operation unit 123 into the receiver 100, and the "measurement time" and the "base station identification number" also set by the operation unit 123 into the data processing unit 500. Upon receiving a signal from the set completion key on the operation unit 123, the major components of the apparatus start measurements.

Figure 10:
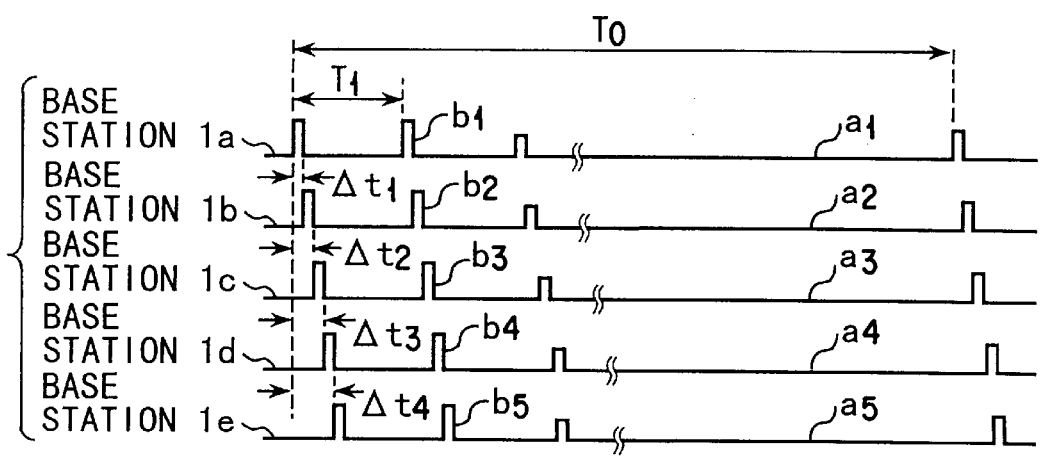
FIG. 10 is a timing chart showing burst signals radiated from the respective corresponding base stations.

In the receiver 100, the burst signals $b_1, b_2, \ldots, b_5$ radiated from the base stations 1a to 1e, FIG. 10, are applied to the frequency converter 7 via the antenna 5, and only the burst signal having a frequency corresponding to the "reception frequency" entered from the operation unit 123 is chosen. The frequency of this burst signal is converted into a low frequency suitable for signal analysis, and the signal with this low frequency is output to the demodulator 8.

The demodulator 8 demodulates the frequency-converted burst signal from the base station into a digital data signal e having no RF component by using an output clock signal c from an internal clock oscillator 9. The demodulator 8 sends the demodulated signal to an internal clock synchronous circuit 10 in the subsequent stage.

Note that as the frequency converter 7 and the demodulator 8 of the receiver 100 and the descramble circuit 12 of the information detector 300 (to be described later), the same parts as in a common mobile station for receiving the communication service can be used. As an example, a commercially available IC similar to the one used in the first embodiment can be used as the demodulator.

The internal clock synchronous circuit 10 of the timing signal generator 200 synchronizes the input digital data signal e with the output clock signal c from the internal clock oscillator 9. The digital data signal, e', synchronized with the clock is applied to the descramble circuit 12 and the frame synchronous detector 11.

The frame synchronous detector 11 has a shift register with the same number, 32, of register stages as the number of bits of the unique word UW, and a memory for storing the bit pattern of the 32-bit unique word UW. The frame synchronous detector 11 inputs each bit data of the digital data signal e' to the first register of the shift register and sequentially shifts the data to the subsequent registers. At the timing at which the bit pattern stored in each of the 32 registers of the shift register agrees with the bit pattern stored in the memory, the frame synchronous detector 11 sends a synchronous detection signal q to a time control circuit 13 in the subsequent stage, as in FIG. 5.

Note that if the bit patterns do not agree, the synchronous detection signal g as this timing signal is not output.

When a time corresponding to the four bits of the channel type CI in the signal format elapses from the input time of the synchronous detection signal q, the time control circuit 13 sends an operation start timing signal $h_1$ to the descramble circuit 12. Upon receiving the operation start timing signal $h_1$, the descramble circuit 12 descrambles the 120 bits following the source identification code in the digital data signal e, returning the signal into an immediately interpretable data string.

Note that, if necessary, the time required for the descramble is delayed, and after the descramble the digital data signal e is sent to the data extraction unit 14 and the CRC error detection unit (determination unit) 122. If the frame synchronous detector 11 does not send the synchronous detection signal q, the descramble circuit 12, naturally, does not perform the descrambling operation.

Also, as illustrated in FIG. 5, the time control circuit 13 outputs a data extraction start timing signal $h_2$ and a CRC error detection start timing signal $h_8$, which is the sum of the synchronous detection signal q and the data extraction start timing signal $h_2$, when time $T_3$ which is the time corresponding to the four bits of the channel type CI plus the time required for the descramble elapses from the input timing of the synchronous detection signal q. If the frame synchronous detector 11 does not send the synchronous detection signal q, the time control circuit 13, of course, outputs neither the data extraction start timing signal $h_2$ nor the CRC error rate detection start timing signal $h_8$.

As in FIG. 5, upon receiving the data extraction start timing signal $h_2$ the data extraction unit 14 of the information detector 300 reads out the 42 bits of the source identification code from the digital data signal e as a base station number $D_N$ and also reads out an 8-bit LCCH interval $ID_3$ from I(BCCH). That is, the data extraction unit 14 extracts the 42-bit-serial base station number $D_N$ of the source identification code and the 8-bit-serial LCCH interval $ID_3$ and applies an n-bit parallel base station number $D_N$ and an n-bit parallel LCCH interface value $D_3$ to the first and second input terminals, respectively, of a data memory 15 in the following stage.

Upon receiving the CRC error detection start timing signal $h_6$ formed by adding the synchronous detection signal q and the data extraction start timing signal $h_2$, the CRC error detection unit 122 performs CRC coding for the CRC application interval (in this embodiment, the range of the descrambled digital data) of the digital data signal e. Thereafter, the result is compared with the CRC bits in the signal format shown in FIG. 5, i.e., the 16 check bits. The resulting error determination data, $D_2$, is applied to the third input terminal of the data memory 15. The same method as the method of the unique word UW detecting means in the frame synchronous detector 11 is used as the method of the comparison with the 16-bit check code.

Note that the CRC coding by the CRC error detection unit 122 can be performed in accordance with the technique shown in FIGS. 4.2 and 18.2 of STANDARD RCR-STD-28 of PHS described earlier.

The time control circuit 13 also sends a level detection timing signal $h_3$ to a level detector 18 in synchronism with the clock signal c from the internal clock oscillator 9.

Meanwhile, the output received signal b from the frequency converter 7 is applied to the demodulator 8 and a logarithmic amplifier (LOG amplifier) 16 where the signal is logarithmically converted. The logarithmically converted received signal b is envelope-detected by an envelope detector 17. The detection signal, i, thus envelope-detected is applied to the level detector 18.

As shown in FIG. 4, in response to the level detection timing signal $h_3$ from the time control circuit 13 the level detector 18 detects the signal level, $D_1$, of the envelope-detected detection signal i. The level detector 18 has an A/D conversion function for applying the detected signal level $D_1$ as n-bit parallel data to the fourth input terminal of the data memory 15.

At the timings at which the base station number $D_N$, the LCCH interval value $D_3$, the signal level $D_1$, and the CRC error determination data $D_2$ are applied to the respective input terminals of the data memory 15, the time control circuit 13 sends to the data memory 15 a write signal $h_5$ for writing the base station number $D_N$ and the LCCH interval value $D_3$, a write signal $h_6$ for writing the signal level $D_1$, and a write signal $h_7$ for writing the CRC error determination data $D_2$. When the measurement time elapses, the time control circuit 13 sends to a data output control unit 120 of the data processing unit 500 a transfer timing signal $h_4$ for permitting transfer of the data from the data memory 15 to the data output control unit 120.

If the synchronous detection signal q is not sent from the frame synchronous detector 11, the write signal $h_6$ for writing the signal level $D_1$ is not sent from the time control circuit 13. That is, the write signal $h_6$ for writing the signal level $D_1$ is not sent if the unique word UW of the digital data signal e and the bit pattern stored in the memory of the frame synchronous detector 11 do not agree with each other. The result is that the signal level $D_1$ is not stored in the data memory 15.

In this case none of the base station number $D_N$, the LCCH interval value $D_3$, and the CRC error determination data $D_2$ is stored in the data memory 15.

Disagreement between the unique word UW of the digital data signal e and the bit pattern stored in the memory of the frame synchronous detector 11 described above means that the burst signal radiated into the air from the designated base station has encountered some obstacle before reaching the antenna 5. This burst signal which has encountered an obstacle is not accumulated as data in the data memory 15.

The data processing unit 500 is constituted by a CPU which includes a RAM and a ROM. The data processing unit 500 includes, as its functional blocks, the data memory 15 previously explained, the arithmetic unit 119, a display memory 121, and the data output control unit 120. The arithmetic unit 119 processes the data from the data memory into a desired form. The display memory 121 stores the data from the data memory 15 and display data for displaying the processed data from the arithmetic unit 119 in a desired format. The data output control unit 120 controls these blocks.

When the measurement is completed, the data output control unit 120 which has received the transfer timing signal $h_4$ described above extracts a signal level $D_1$ in which the input "base station identification number" from the operation unit 123 and the base station number $D_N$ agree with each other, and in which no error has occurred in the CRC error determination data $D_2$.

For the extracted signal level $D_1$, any of "mean value processing", "median value processing", "maximum value processing", and "minimum value processing" corresponding to the measurement time is executed. One or a plurality of processing results are displayed on the display unit 24 as the representative values corresponding to the measurement position and the measurement time, together with the corresponding base station number $D_N$.

The values displayed on the display unit 24 are the level processed values of burst signals which are included in burst signals radiated from the base stations corresponding to the "base station identification numbers" entered from the operation unit 123, and which have not encountered any obstacle prior to reaching the antenna 5.

The data output control unit 120 sends the data read out from the data memory to the arithmetic unit 119 and causes the arithmetic unit 119 to calculate the burst error rate explained below. The number of signal levels $D_1$ extracted from the data memory 15 indicate the number of burst signals which have passed the unique word detection done by the frame synchronous detector 11 and the CRC error determination. That is, the number of signal levels $D_1$ is the number, p, of burst signals which are radiated from the designated base stations and have reached the antenna 5 without encountering any obstacle.

On the other hand, the number, r, of burst signals coming from the designated base stations to the antenna 5 within the "measurement time" set on the operation unit 123 can be calculated from the following equations by using the LCCH interval value $D_3$ stored in the data memory 15. 5 ms in Equation (2) is the time defined in a certain PHS. Accordingly, 5 ms×$D_3$ corresponds to the repetition period of the burst signal.

$$r = (\text{measurement time})/(5 \text{ ms} \times D_3) \quad (2)$$

From the numbers p and r of burst signals, the number, s, of burst signals which are radiated from the designated base stations and have encountered some obstacle before reaching the antenna 5 can be represented by Equation (3) below:

$$s = r - p \quad (3)$$

From the calculation results of the burst signal numbers r and s, a newly defined burst signal rate t is calculated by Equation (4) below:

$$t = s/r \quad (4)$$

Figures 12, 13:
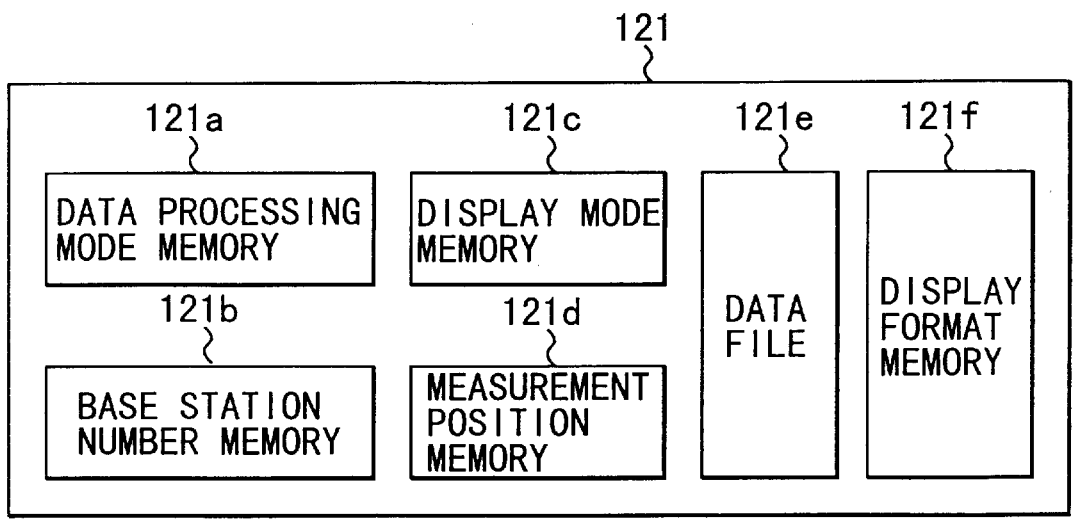
FIG. 12 is a block diagram showing the stored contents of a display memory in the apparatus of the second embodiment.
FIG. 13 is a view showing the displayed contents of a display unit in the apparatus of the second embodiment.

The burst error rate t calculated by Equation (4) is displayed on the display unit 24. More specifically, the data output control unit 120 reads out necessary display data and format from the display memory 121 in accordance with the designation from the operation unit 123 and displays the burst error rate t, together with the level measurement value $D_1$ and the corresponding base station number $D_N$, on the display unit 24. A practical example of the display contents is shown in FIG. 13.

A process in which the measurer evaluates and determines the radio wave quality from the level measurement values and the burst error ratio measurement values obtained by this radio wave measuring apparatus will be described below.

To determine the radio wave quality at the measurement points, the measurer has determination reference values ready beforehand, by which the level measurement values and the burst error rate measurement values obtained by the radio wave measuring apparatus are evaluated. The measurer can form Table 1 below, as a quality determination matrix, in accordance with whether the level measurement values and the burst error rate measurement values of the radio wave measuring apparatus meet the determination reference values.

TABLE 1

|  | Level measurement | Burst error measurement |
|---|---|---|
| Case 1 | ○ | ○ |
| Case 2 | ○ | X |
| Case 3 | X | ○ |
| Case 4 | X | X |

In the quality determination results in Table 1 as the quality determination matrix, in Case 1 both of the level measurement value and the burst error rate measurement value meet the determination reference values determined by the measurer. That is, in Case 1 the measurer determines that the received radio wave has no quality problem.

In Case 2, on the other hand, although the level measurement value satisfies the determination reference value, the burst error rate measurement value does not satisfy the determination reference value. This means that the burst signal radiated into the air from the designated base station has encountered some obstacle before reaching the antenna 5. From this result, the measurer determines that this radio wave has a quality problem, i.e., has suffered from multiple reflection.

In each of Cases 3 and 4, the level measurement value does not meet the determination reference value, so the measurer determines that the radio wave has a quality problem. If this is the case, the corresponding base station may be reinstalled by taking account of the distance from the base station and the conditions of the surrounding buildings.

The data output control unit 120 controls the display memory 121 which stores necessary data for various displays as shown in FIG. 12, and displays the data in a desired format, by which the data is readily analyzed, on the display unit 24 which is constituted by a liquid crystal display or the like.

The display memory 121 includes, e.g., a display mode memory 121c which stores display modes set by the operator through the operation unit 123, a measurement position memory 121d, a data processing mode memory 121a, a base station number memory 121b, a data file 121e, and a display format memory 121f.

As in the first embodiment, the display modes which the operator can select in the radio wave measuring apparatus of this second embodiment are "time axis display mode" and "processing result display mode". The "processing result display mode" includes four signal level display orders, i.e., "reception order", "signal level order", "base station number order", and "designated base station order", and two display forms, i.e., "graphic display" and "numerical display".

The data processing modes which are set in the data processing mode memory 121a upon being designated by the operator through the operation unit 123 include three modes, i.e., "mean value processing", "median value processing", and "maximum value processing".

The display format memory 121f stores display formats corresponding to the individual display modes described above.

The measurement position memory 121d stores the present measurement positions, $P_1, P_2, \ldots, P_N$, which the operator enters through the operation unit 123.

The data output control unit 120 which has received the transfer timing signal $h_4$ described above reads out the display mode from the display mode memory 121c, prior to transferring the data. If the display mode is the time axis display mode, the data output control unit 120 transfers the contents of the data memory 15 to the data file 121e. If the display mode is the processing result display mode, the data output control unit 120 reads out the data processing mode from the data processing mode memory 121a and, in accordance with the readout processing mode, transfers the data-processed signal level $D_L$ and the base station number $D_N$ to the data file 121e.

In all data processing, the data output control unit 120 first causes the arithmetic unit 119 to calculate the levels $L_1, L_2, \ldots, L_5$ of the burst signals $b_1, b_2, \ldots, b_5$ received from the base stations 1a to 1e. More specifically, each level is calculated by averaging out the signal levels $D_1$ between the bursts.

Of the signal levels $D_1$ written in the data memory 15, the data output control unit 120 determines the signal levels $D_1$ to be averaged out in each burst from the relative positional (address) relationship between the base station numbers $D_N$ and the signal levels $D_1$ written in the data memory 15.

In the mean value processing, the data output control unit 120 calculates a mean value $D_L$ of the burst signal levels $L_1, L_2, \ldots, L_5$ during a defined time $T_0$ in the received signal b, FIG. 4, for each base station. In the median value processing, the data output control unit 120 calculates a median value $D_L$ for each base station. In the maximum value processing, the data output control unit 120 calculates a maximum value $D_L$ for each base station.

In the processing result display mode, the data output control unit 120 transfers the data-processed signal level $D_L$ and the base station number $D_N$ of each base station to the data file 121e.

As in the first embodiment, the data output control unit 120 of the data processing unit 500 is so programmed as to perform data processing based on the signal levels $D_1$ of the burst signals $b_1$ to $b_5$ detected by the level detector 18 and the base station numbers $D_N$ of the burst signals $b_1$ to $b_5$ extracted by the data extraction unit 14, and perform display processing as illustrated in FIGS. 6, 7A, 7B, and 8, in accordance with the flow charts shown in FIGS. 2 and 3.

As described above, the radio wave measuring apparatus according to the second embodiment of the present invention is so designed that the burst signals time-divisionally radiated from the individual base stations are received, the timing generator generates timings synchronized with these bursts, and the level measurement unit, the information detector, and the determination unit operate on the basis of the generated timings. Consequently, it is possible to test the measured level of a burst signal at a certain timing and the validity of the digital data, corresponding to the base station which has radiated the burst signal. Additionally, since the validity of the digital data also is determined, it is possible to quantitatively check an error of the burst signal caused by an influence, such as multiple interference, that cannot be determined only by the level of a radio wave at the measurement position. Consequently, the essential quality of the received radio wave can be evaluated.

When the radio wave measuring apparatus according to the second embodiment of the present invention is used, if the measurement result or the radio wave quality is abnormal, the measurer can analyze the cause of the abnormality to some extent in the measurement work site and then proceed on to the next measurement work. This greatly improves the efficiency in evaluating the radio wave quality.

Note that the present invention is applicable not only to the PHS applied in the first and second embodiments described above but also to the measurements of burst signal levels performed in digital communication systems, such as PDC (Japan digital automobile telephone system), NADC (American digital automobile telephone system), GSM (European digital automobile telephone system), and DMCA (Japan digital MCA system).

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A radio wave measuring apparatus for measuring field intensities of radio waves to be measured including a plurality of burst waveform signals modulated by digital data signals, which are sequentially transmitted time-divisionally from a plurality of base stations and contain transmission source base station information, comprising:

a receiver having a digital data signal demodulator for receiving the radio waves and demodulating the digital data signals;

a timing signal generator for generating timing signals for extracting the transmission source base station information in synchronism with the burst waveform signals, in accordance with the radio waves received by said receiver;

an information detector for receiving the digital data signals output from said digital data signal demodulator and the timing signals output from said timing signal generator and detecting received information containing the transmission source base station information of the burst waveform signals;

a level measurement unit for detecting field intensities of the burst waveform signals contained in the radio waves received by said receiver; and a data processing unit for outputting the field intensities of the burst waveform signals detected by said level measurement unit and the transmission source base station information detected by said information detector in a one-to-one correspondence with each other, on the basis of the timing signals from said timing signal generator.

2. An apparatus according to claim 1, wherein said receiver comprises:

an antenna for receiving the radio waves; and a frequency converter for converting frequencies of the radio waves received by said antenna into a predetermined frequency suitable for signal analysis.

3. An apparatus according to claim 2, wherein said timing signal generator comprises:

an internal clock oscillator for oscillating a predetermined clock signal with which said digital data signal demodulator demodulates the digital data signals from the burst signals contained in the radio waves whose frequencies are converted by said frequency converter;

an internal clock synchronous circuit for synchronizing the digital data signals demodulated by said digital data signal demodulator with the clock signal from said internal clock oscillator;

a frame synchronous circuit for detecting a synchronous detection signal on the basis of the digital data signals synchronized with the clock signal by said internal clock synchronous circuit and the clock signal from said internal clock oscillator; and a time control circuit for outputting a predetermined number of timing signals having a predetermined timing relationship, on the basis of the synchronous detection signal from said frame synchronous circuit.

4. An apparatus according to claim 3, wherein said information detector comprises:

a descramble circuit for descrambling the digital data signals synchronized with the clock signal by said internal clock synchronous circuit, in accordance with a first timing signal from said time control circuit; and a data extraction unit for extracting the transmission source base station information corresponding to the burst signals from the digital data signals descrambled by said descramble circuit, in accordance with a second timing signal from said time control circuit.

5. An apparatus according to claim 4, wherein said level measurement unit comprises:

a logarithmic amplifier for logarithmically converting the burst signals contained in the radio waves whose frequencies are converted by said frequency converter;

an envelope detection circuit for detecting envelopes of the burst signals logarithmically converted by said logarithmic amplifier; and a level detector for detecting signal levels corresponding to the burst signals on the basis of envelope detection signals from said envelope detection circuit, in accordance with a third timing signal from said time control circuit.

6. An apparatus according to claim 5, wherein said data processing unit includes a control unit for executing processing in which the signal levels corresponding to the burst signals, which are detected by said level detector, and the transmission source base station information corresponding to the burst signals, which are extracted by said data extraction unit, are displayed on a display unit in a one-to-one correspondence with each other.

7. An apparatus according to claim 6, wherein said data processing unit further comprises:

a data memory for temporarily storing the signal levels corresponding to the burst signals, which are detected by said level detector, and the transmission source base station information corresponding to the burst signals, which are extracted by said data extraction unit, in accordance with fourth and fifth timing signals from said time control circuit, wherein the signal levels and the transmission source base station information corresponding to the burst signals, which are temporarily stored in said data memory, are transferred to said control unit in accordance with a sixth timing signal from said time control circuit.

8. An apparatus according to claim 7, wherein said data processing unit further comprises:

an operation unit for selectively entering to said control unit a plurality of display modes, a plurality of data processing modes, base station numbers, and measurement position information;

a storage unit including a plurality of memories for storing the plurality of display modes, the plurality of data processing mode, the base station numbers, and the measurement position information entered from said operation unit to said control unit; and a display format memory for storing display formats corresponding to the plurality of display modes entered from said operation unit to said control unit.

9. An apparatus according to claim 8, wherein the plurality of display modes include at least one of a time axis display mode and a processing result display mode, and the processing result display mode includes at least one of a reception order, a signal level order, a base station number order, and a designated base station order, as a signal level display order, and at least one of graphic display and numerical display, as a display form.

10. An apparatus according to claim 8, wherein the plurality of data processing modes include at least one of mean value processing, median value processing, and maximum value processing.

11. An apparatus according to claim 4, wherein said information detector includes an error detection unit for detecting error determination data corresponding to the burst signals on the basis of the digital data signals descrambled by said descramble circuit, in accordance with a fourth timing signal from said time control circuit.

12. An apparatus according to claim 11, wherein said data processing unit includes a control unit for executing processing in which the signal levels corresponding to the burst signals, which are detected by said level detector, the transmission source base station information corresponding to the burst signals, which are extracted by said data extraction unit, and the error determination data corresponding to the burst signals, which are detected by said error detection unit, are displayed on a display unit in a one-to-one correspondence with each other.

13. An apparatus according to claim 12, wherein said data processing unit further comprises:

a data memory for temporarily storing the signal levels corresponding to the burst signals, which are detected by said level detector, the transmission source base station information corresponding to the burst signals, which are extracted by said data extraction unit, and the error determination data corresponding to the burst signals, which are detected by said error detection unit, in accordance with fourth, fifth, and sixth timing signals from said time control circuit, and the signal levels, the transmission source base station information, and the error determination data corresponding to the burst signals, which are temporarily stored in said data memory, are transferred to said control unit in accordance with a seventh timing signal from said time control circuit.

14. An apparatus according to claim 13, further comprising:

an operation unit for setting a reception frequency in said receiver and setting a plurality of display modes, a plurality of data processing modes, measurement position information, a measurement time, and base station numbers in said data processing unit.

15. An apparatus according to claim 14, wherein said data processing unit further comprises:

an arithmetic unit for performing desired processing for various data transferred from said data memory; and a display memory for storing display data for displaying the various data transferred from said data memory and the data processed by said arithmetic unit in a desired format.

16. An apparatus according to claim 15, wherein said display memory includes a plurality of memories for storing the plurality of display modes, the plurality of data processing modes, the base station numbers, and the measurement position information which are set in said data processing unit by said operation unit.

17. An apparatus according to claim 16, wherein
the plurality modes include at least one of a time axis display mode and a processing result display mode, and
the processing result display mode includes at least one of a reception order, a signal level order, a base station number order, and a designated base station order, as a signal level display order, and at least one of graphic display and numerical display, as a display form.

18. An apparatus according to claim 16, wherein the plurality of data processing modes include at least one of mean value processing, median value processing, and maximum value processing.

19. A radio wave measuring apparatus for sequentially receiving burst signals time-divisionally radiated from a plurality of base stations and modulated by digital data signals containing base station information indicating transmission source base stations, and measuring received signal levels of the burst signals radiated from said base stations at a reception position, comprising:

a demodulator for sequentially receiving and demodulating the burst signals radiated from said base stations, and outputting demodulated digital data signals;

a timing signal generator for outputting a first timing signal for extracting the base station information and a second timing signal for detecting the received signal levels of the burst signals radiated from said base stations, upon receiving the demodulated digital data signals output from said demodulator;

a data extraction unit for extracting the base station information from the demodulated digital data signals output from said demodulator, upon receiving the first timing signal from said timing signal generator;

a level detector for detecting the received signal levels of the burst signals radiated from said base stations, upon receiving the second timing signal from said timing signal generator;

a data memory for storing the received signal levels detected by said level detector and the base station information extracted by said data extraction unit in a one-to-one correspondence with each other;

a display unit for displaying various information; and a data processing unit for reading out the received signal levels and the base station information stored in a one-to-one correspondence with each other in said data memory, and causing said display unit to display read-out received signal levels and base station information in one-to-one correspondence with each other, in accordance with elapse of a reception time.

20. An apparatus according to claim 19, wherein said data processing unit causes said display unit to display the received signal levels and the base station information stored in said data memory in an order of designated base station information, in accordance with elapse of the reception time.

21. An apparatus according to claim 19, wherein said data processing unit calculates signal levels of burst signals corresponding to the base station information from the received signal levels and the base station information stored in said data memory in accordance with a designated data processing mode, calculates desired values of the signal levels of the burst signals for the same base station information, and causes said display unit to display the calculated desired values together with the base station information.

22. An apparatus according to claim 21, wherein said data processing unit causes said display unit to display only designated base station information and desired values of signal levels of burst signals corresponding to the designated base station information.

23. An apparatus according to claim 21, wherein said data processing unit causes said display unit to display a graph in which an ordinate represents desired values of signal levels of burst signals and an abscissa indicates the base station information so that a given base station can be specified.

24. A radio wave measuring apparatus comprising:

a receiver for receiving burst waveforms of radio waves to be measured which are time-divisionally transmitted from a plurality of base stations and includes a plurality of predetermined information containing base station information indicating transmission source base stations and information necessary for transmission;

a timing generator for generating first and second timing signals synchronized with the burst waveforms contained in the radio waves received by said receiver;

an information detector for extracting the predetermined information contained in the radio waves received by said receiver, upon receiving the first timing signal from said timing generator;

a level measurement unit for measuring levels of the radio waves received by said receiver, upon receiving the second timing signal from said timing generator;

a determination unit for determining validity of the radio waves received by said receiver for each burst waveform, on the basis of the predetermined information extracted by said information detector; and a data processing unit for outputting determination results of said determination unit and the levels of the radio waves measured by said level measurement unit in a one-to-one correspondence with the base station information contained in the predetermined information extracted by said information extraction unit.

25. A radio wave measuring apparatus comprising:

a measurement unit for sequentially receiving burst waveform signals of radio waves time-divisionally radiated from a plurality of base stations and modulated by digital data signals containing transmission source base station information, measuring received signal levels of the burst waveform signals radiated from said base stations at a reception position, and extracting the base station information;

a data memory for storing the base station information and the received signal levels of the burst waveform signals radiated from said base stations;

a data processing unit, including a processor, for combining individual data stored in said data memory to selectively process and output the data in a display format desired by a user; and display means, connected to said processor, for displaying the base station information and the received signal levels of the burst waveform signals radiated from said base stations at at least a certain reception position in a one-to-one correspondence.

26. An apparatus according to claim 25, further comprising:

a receiver having a digital data signal demodulator for receiving the radio waves and, demodulating the digital data signals;

a timing signal generator for generating timing signals for extracting the transmission source base station information in synchronism with the burst waveform signals, in accordance with the radio waves received by said receiver;

an information detector for receiving demodulated digital data signals output from said digital data signal demodulator and the timing signals output from said timing signal generator and detecting received information containing the transmission source base station information of the burst waveform signals; and a level measurement unit for detecting field intensities of the burst waveform signals contained in the radio waves received by said receiver.

27. An apparatus according to claim 25, wherein said measurement unit detects and outputs some errors of digital data contained in the burst waveform signals, and said data memory, said data processing unit, and said display means cooperate with each other so as to process the some errors of the digital data together with the transmission source base station information and the received signal levels of the burst waveform signals radiated from said base stations in a one-to-one correspondence.

* * * * *